United States Patent
Alwin et al.

(10) Patent No.: US 6,668,640 B1
(45) Date of Patent: Dec. 30, 2003

(54) DUAL-CHANNEL ELECTRONIC MULTI-FUNCTION PROBES AND METHODS FOR REALIZING DISSIMILAR AND INDEPENDENT AIR DATA OUTPUTS

(75) Inventors: Steven Floyd Alwin, St. Paul, MN (US); Dennis James Cronin, Shakopee, MN (US); Mark Charles Skarohlid, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/217,060

(22) Filed: Aug. 12, 2002

(51) Int. Cl.$^7$ ................................. G01L 7/00

(52) U.S. Cl. ................................. 73/170.02

(58) Field of Search ............... 73/861.65–861.68, 73/202, 203, 708, 714, 181, 182, 183, 170.02, 170.14, 147; 700/11, 14

(56) References Cited

U.S. PATENT DOCUMENTS

| | | |
|---|---|---|
| 3,318,146 A | 5/1967 | De Leo et al. |
| 4,378,696 A | 4/1983 | DeLeo et al. ............. 73/180 |
| 4,378,697 A | 4/1983 | DeLeo et al. ............. 73/182 |
| 4,672,846 A | 6/1987 | LeBlond et al. .......... 73/180 |
| 5,205,169 A | 4/1993 | Hagen ...................... 73/180 |
| 5,319,970 A | 6/1994 | Peterson et al. ........ 73/182 |
| 5,369,993 A | 12/1994 | Hagan ...................... 73/178 |
| 5,485,412 A | 1/1996 | Sarkkinen et al. ..... 364/724.05 |
| 5,653,538 A | 8/1997 | Phillips .................... 374/138 |
| 5,731,507 A | 3/1998 | Hagen et al. ............. 73/182 |
| 6,012,331 A | 1/2000 | Menzies et al. .......... 73/180 |
| 6,076,963 A | 6/2000 | Menzies et al. .......... 374/138 |

OTHER PUBLICATIONS

F.W. Hagen and Dr. H. Seidel, "Deutsche Airbus Flight Test of Rosemount Smart Probe for Distributed Air Data System", IEEE AES Systems Magazine, Apr. 1994, pp 7–14.

Bulletin 1013, "Pitot and Pitot–Static Probes", BFGoodrich (May 1998).

T.J. Rohloff, S.A. Whitmore and I. Catton, "Air Data Sensing from Surface Pressure Measurements Using a Neural Network Method", AIAA Journal, Vo. 36, No. 11, Nov. 1998, pp. 2095–2101.

T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.

(List continued on next page.)

Primary Examiner—William Oen
(74) Attorney, Agent, or Firm—Westman, Champlin & Kelly, P.A.

(57) ABSTRACT

A system for providing independent and dissimilar aircraft parameter estimations includes first and second dual-channel electronic multi-function probes (MFPs) positionable adjacent an aircraft skin. Each dual-channel electronic MFP has pressure sensing ports and an electronics housing. Located within the electronics housing of each dual-channel electronic MFP are first and second electronics channels. The first electronics channel of the first dual-channel electronic MFP is electrically coupled with the first electronics channel of the second dual-channel electronic MFP can provide a first air data system providing aircraft parameter estimations. The second electronics channel of the first dual-channel electronic MFP can be electrically coupled with the second electronics channel of the second dual-channel electronic MFP to provide a second air data system providing aircraft parameter estimations. The first and second air data systems are independent and dissimilar from one another.

14 Claims, 10 Drawing Sheets

OTHER PUBLICATIONS

T.J. Rohloff and I. Catton, "Fault Tolerance and Extrapolation Stability of a Neural Network Air–Data Estimator", Journal of Aircraft, vol. 36, NO. 3, May–Jun. 1999, pp. 571–576.

Truman M. Stickney, Marvin W. Shedlov and Donald I. Thompson, "Total Temperature Sensors, Technical Report 5755, Revision C", Rosemount Aerospace/BFGoodrich (Jan. 1994).

"BFGoodrich–Aircraft Sensors Division Air Data System with SmartProbe for Fairchiled Dornier 728JET", BFGoodrich–Rosemount Aerospace, Addendum to D9820217 Rev. B, Oct. 1998, pp. 1–10.

"SmartProbe™ Air Data System for Embraer ERJ–170 & 190", BFGoodrich–Aircraft Sensors Division, Proposal D9920133, Apr. 1999, pp. 1–65.

DUAL-CHANNEL ELECTRONIC MULTI-FUNCTION PROBES AND METHODS FOR REALIZING DISSIMILAR AND INDEPENDENT AIR DATA OUTPUTS

BACKGROUND OF THE INVENTION

The present invention relates generally to air data sensing systems for use on aircraft. More particularly, the present invention relates to multi-function probes, air data systems and methods of achieving dissimilarity and independence of air data outputs.

Air data systems that calculate the aerodynamic aircraft angle of attack (AOA) and angle of sideslip (AOS) of an air vehicle utilizing independent probes that are not pneumatically coupled, but which have processors for interchanging electrical signals between the probes, are known in the art. These probes are sometimes referred to as electronic multi-function probes (MFPs) or air data sensing probes (ADSPs). One type of electronic MFP is the SmartProbe sold by Goodrich Corporation. Multi-function probes include processing circuitry located at the probe itself as part of its instrument package, and are therefore sometime referred to as electronic multifunction probe air data computers. During sideslip of the air vehicle, compensation of various local (to the probes) parameters or signals, such as angle of attack and static pressure, is necessary for accurate determination of aircraft angle of attack and other aircraft parameters including determination of altitude from static pressure or other means. This requirement for accuracy in altitude indications is particularly important in Reduced Vertical Separation Minimum (RVSM) space areas of the air traffic control system.

In conventional air data systems, probes on opposite sides of an aircraft can be pneumatically connected so that the pressure signals are averaged between the right side of the aircraft and the left side of the aircraft to provide a static pressure that is "nearly true". In most conventional systems therefore, although corrections are made for Mach number and aircraft angle of attack, it is rare that neglecting sideslip effect will introduce enough error to warrant a correction based on sideslip for the cross coupled probes. However, electronic MFPs are connected only electrically in order to eliminate the need for pneumatic tubing passing between the opposite sides of the aircraft or between probes on the same side of the aircraft. This means that each probe is pneumatically independent, even if it is electrically communicating with other probes.

As aircraft systems such as flight control systems and stall protection systems become more highly integrated, complex and automated, the integrity of the air data information that is used by these aircraft systems becomes increasingly more critical. These highly complex systems require redundant inputs of air data information that are measured by independent sources. Furthermore, the independent sources of air data are desired to be derived from dissimilar equipment to reduce the risk of common mode errors occurring amongst the separate sources of air data. This independence and dissimilarity of air data outputs is strongly recommended by certification authorities in the United States and Europe. The dissimilarity and independence ensures a level of safety that is consistent with the complexity of the systems that are consuming the data.

As an example, in RVSM space areas of the air traffic control system, the United States Federal Aviation Administration (FAA) allows aircraft to fly with only 1,000 feet of vertical separation, but requires that the altimetry system must meet stringent accuracy requirements. Further, the FAA requires that an aircraft have at least two independent altimetry systems, preferably dissimilar systems. Further, dissimilarity in aircraft systems becomes even more important in fly-by-wire aircraft systems and operation. Because the aviation authorities consider the loss of air data systems as being catastrophic, they require that the probability of such a loss be extremely low. For example, a current requirement is that the probability of the air data system being lost be less than $10^{-9}$. If two independent air data systems have the remote possibility of experiencing common mode failures, the authorities are likely to determine that the probability of a loss of all air data systems exceeds this threshold. An additional requirement enforced by the FAA and JAA is called out under FAR/JAR 25.1309, which states that "no single failure may result in a catastrophic event." Thus, the assurance of eliminating common mode failures is paramount.

To provide redundancy in estimations of aircraft AOA and AOS, multiple electronic MFPs are used in an air data sensing system. The multiple electronic MFPs can be used in pairs to define multiple probe systems each having two electronic MFPs as members. A single electronic MFP can be a member of several different probe systems. It is known that estimations of local AOA at two MFPs in a probe system can be used to predict aircraft AOA and aircraft AOS. It is also know that aircraft AOA and AOS can be calculated or estimated by using the local pressure ratios Psl/qcl, where Psl is the local static pressure and qcl is the local impact pressure (the difference between the total pressure and the local static pressure, $P_T$–Psl) from each of two uniquely located probes. In other words, each two-probe system can arrive at estimations of aircraft AOA and aircraft AOS which are a unique function of the local AOA estimations at the two probes or a unique function of the pressure ratio Psl/qcl at each probe.

One advantage of utilizing electronic multifunction probe air data computers in air data applications is the use of common equipment for all probes, thereby reducing the number of line replaceable unit (LRU) spares required for the aircraft. The disadvantage of this commonality is that, traditionally, there exists no dissimilarity between the electronic multifunction probe systems. The lack of dissimilarity exposes the air data system to the risk of common mode failures in hardware, firmware and software thereby potentially comprising the integrity of the system.

Consequently, systems and methods for realizing dissimilar and independent air data output would be a significant improvement in the art.

SUMMARY OF THE INVENTION

A system for providing independent and dissimilar aircraft parameter estimations includes first and second dual-channel electronic multi-function probes (MFPs) positionable adjacent an aircraft skin. Each dual-channel electronic MFP has pressure sensing ports and an electronics housing. Located within the electronics housing of each dual-channel electronic MFP are first and second electronics channels. The first electronics channel of the first dual-channel electronic MFP is electrically coupled with the first electronics channel of the second dual-channel electronic MFP to provide a first air data system providing aircraft parameter estimations. The second electronics channel of the first dual-channel electronic MFP is electrically coupled with the second electronics channel of the second dual-channel electronic MFP to provide a second air data system providing aircraft parameter estimations. The first and second air data systems are independent and dissimilar from one another.

DETAILED DESCRIPTION OF AN ILLUSTRATIVE EMBODIMENT

Figure 1:
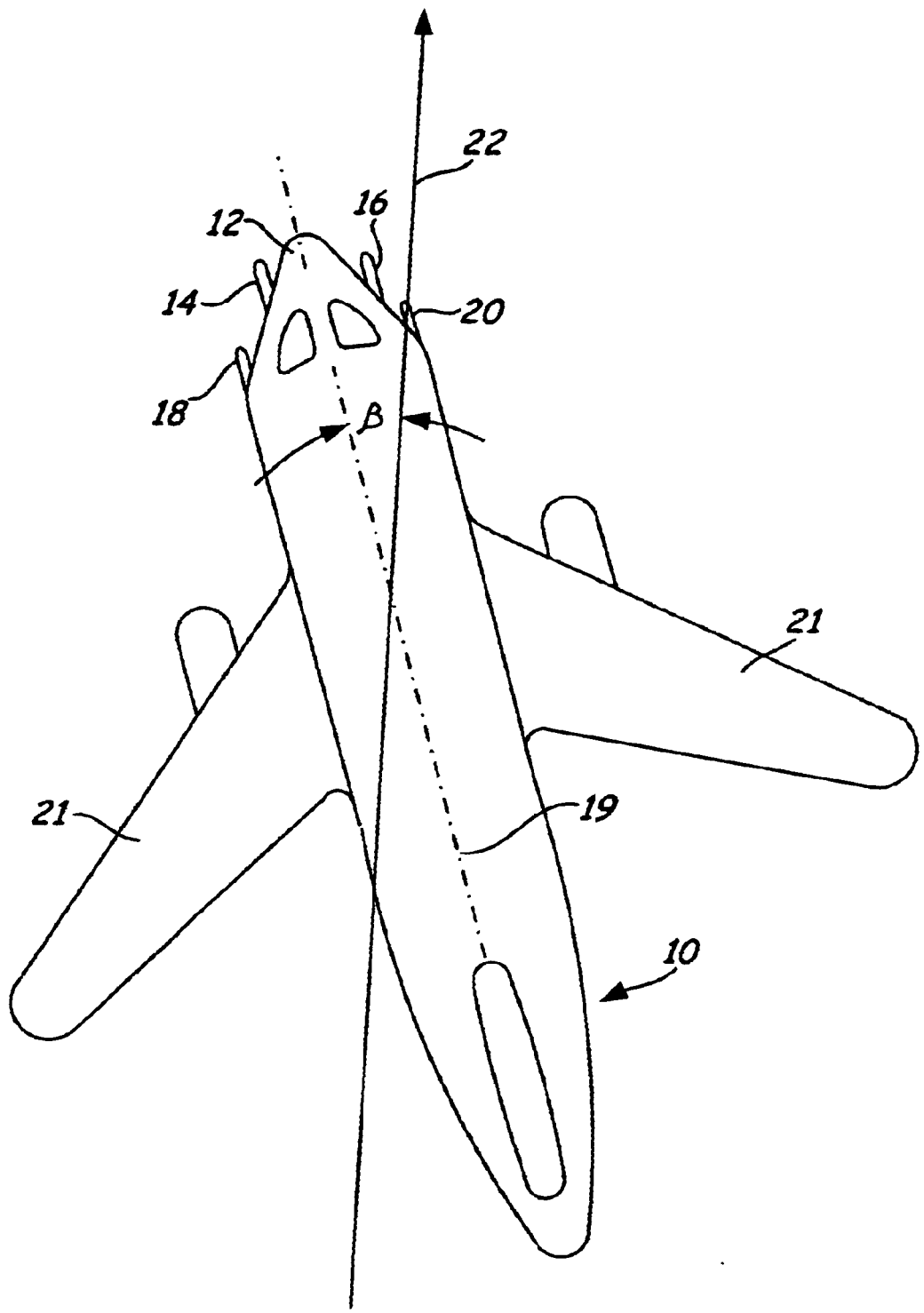
FIG. 1 is a top plan view of an aircraft illustrating a sideslip condition.

Referring to FIG. 1, an aircraft indicated generally at 10 is shown with a nose portion 12. Mounted dual-channel air data sensing probes (ADSPs) or multi-function probes (MFPs) are indicated schematically and generally at 14, 16, 18 and 20 to form a four-probe air data sensing system. As discussed below, combinations of the MFPs can be used to define multiple two-probe systems. In particular, combinations of the MFPs can be used to define multiple independent and dissimilar air data systems. The number of independent systems depends on the number of sources of local static pressure and local angle of attack (AOA) that can be combined to give a unique representation of aircraft levels of AOA angle of sideslip (AOS), and altitude.

The positioning of aircraft 10 is with respect to a center plane or center line 19 that is perpendicular to the normal plane of the wings 21. Center line 19 is shown in a greatly exaggerated sideslip condition where the path of travel of aircraft 10 is indicated at 22, and where there is a substantial angle β between the path of travel line 22 and the line or plane 19. Angle β is the aircraft angle of sideslip (AOS), which is defined herein as an aircraft parameter. The aircraft essentially is yawing to the left in FIG. 1. As the airflow passes across the aircraft, the probes 14 and 18 will be subjected to different flow conditions, insofar as the angle of wind and local static pressure is concerned, than are the probes 16 and 20 and most likely different from each other.

Another aircraft parameter is aircraft angle of attack (AOA). It also can also be envisioned that if the aircraft changes angle of attack, because of the yaw angle, the amount of change in pressure on one side of the aircraft would be different than that on the other side of the aircraft. When the probes are only electrically connected together, it may be difficult to simply average these changes to obtain a sideslip-corrected static pressure reading. The angle of sideslip value can eventually be used as a correction factor to compensate for this angle in a systematic manner.

An electronic multi-function probe or MFP is defined as a probe in which a computer is integrally attached as a processor to the probe, and the sensing portions of the probe itself protrude in the airstream that moves past the aircraft skin. The processor is in an integrated housing immediately inside the skin. The outputs from electronic MFPs are digital electrical signals representing pressures derived from sampling the pressure readings from internal pressure sensors. The internal pressure sensors of an electronic MFP can be either differential sensors or absolute sensors that receive the pressure signals and convert them into electrical signals that are then digitized.

The probes 14, 16, 18 and 20 may be similar to probes such as that shown in the U.S. Pat. No. 4,378,696, or other similar patents. However, in the present invention the probes are dual-channel electronic MFPs which aid in achieving system dissimilarity, as is discussed below in greater detail. As shown schematically in FIG. 2A, in one example embodiment the probes have barrels 14A, 16A, 18A and 20A, with suitable ports for sensing total pressure at leading ends of the probes indicated at 14B, 16B, 18B and 20B. The angle of attack sensing ports are placed on the top and bottom of the probes, and the top ports are illustrated schematically at 14C, 16C, 18C and 20C. Mating ports are on the lower portion, as is well known, for measuring the angle of attack by sensing the differentials in pressure between the upper port and the lower port. The lower port on the probes will sense a pressure designated $P\alpha_1$, and the upper ports shown at 14C, 16C, 18C and 20C sense a pressure designated $P\alpha_2$. Each of the probes 14, 16, 18 and 20 is provided with a separate instrument housing 14D, 16D, 18D and 20D, respectively.

Figure 2A:
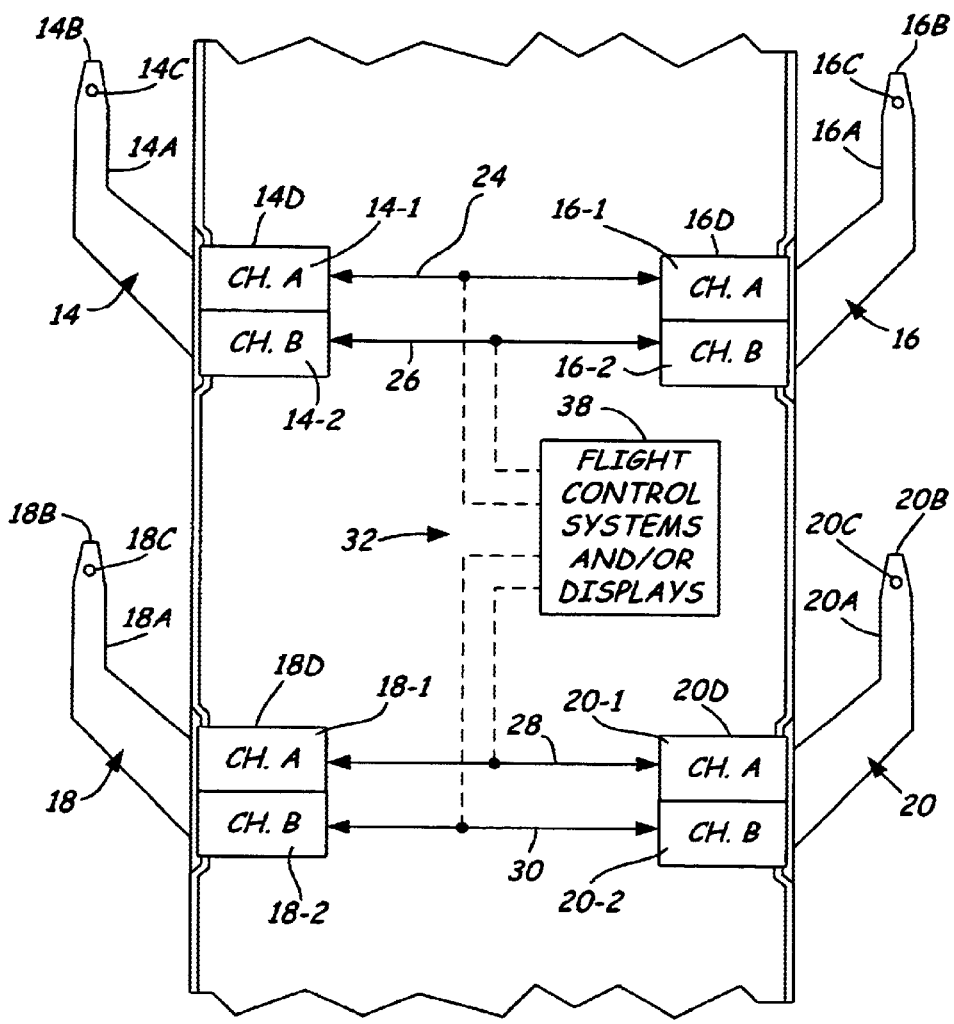
FIG. 2A is a schematic representation of a cross section of a nose portion of an aircraft showing placement of dual-channel air data sensing probes, called dual-channel electronic multi-function probes (MFPs), made and configured to function in accordance with the present invention in one form.
Figure 2B:
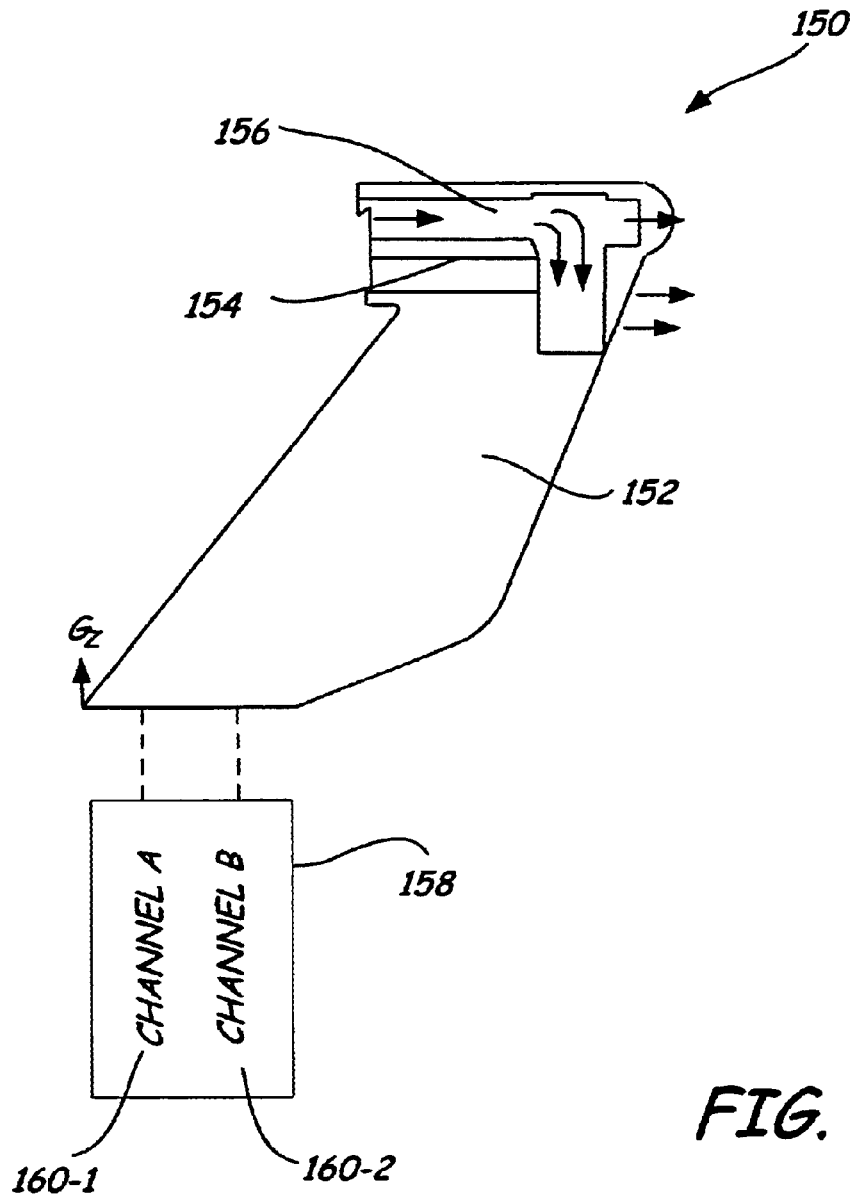
FIG. 2B is a diagrammatic representation of a vane-type of electronic dual-channel MFP in accordance with some embodiments of the present invention.

In alternative embodiments which can also be considered to diagrammatically illustrated in FIG. 2, features 14A, 16A, 18A and 20A are vanes, cones or other types of sensing devices, instead of barrels. The various drawings illustrating one or more of MFPs 14, 16, 18 and 20 are to be interpreted as including different types of electronic MFPs than those using a barrel. For example, referring for the moment to FIG. 2B, shown is an electronic MFP 150 which could be used as one of electronic MFPs 14, 16, 18 and 20 in alternate embodiments of the invention. MFP 150 includes a vane 152 which rotates to provide an indication of AOA. Located on vane 152 are one or more pressure sensing ports 154, such as a pitot pressure sensing port, for providing additional pressure measurements. Although not required in all embodiments, the electronic MFP 150 shown in FIG. 2B also includes a total air temperature (TAT) probe 156 formed integrally with the remainder of the electronic MFP 150. An instrument housing 158, which can be similar to housings 14D, 16D, 18D and 20D is positionable inside the skin of the aircraft while the vane protrudes into the airstream that moves past the skin of the aircraft. As will be discussed below in greater detail, instrument housing 158 includes two channels of circuitry (as illustrated in FIG. 2B, channel A circuitry 160-1 and channel B circuitry 160-2.

Figure 2C:
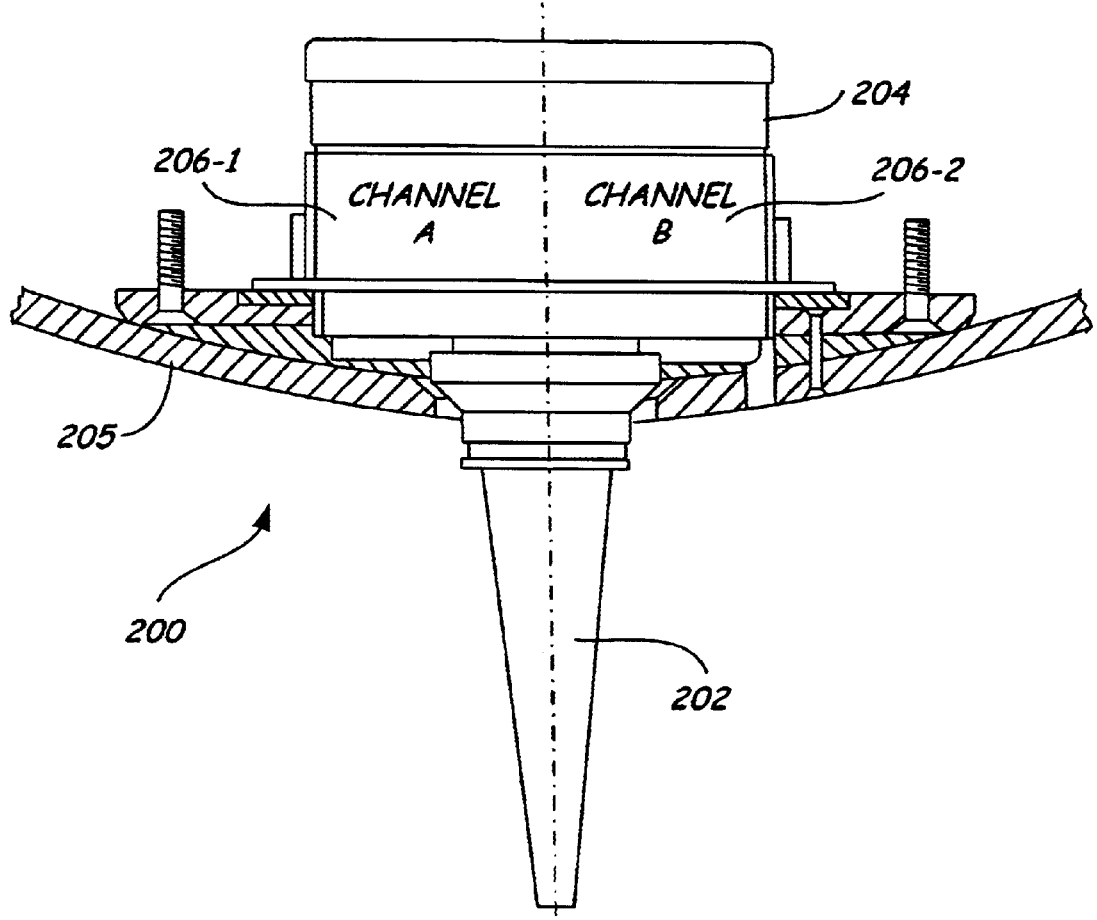
FIG. 2C is a diagrammatic representation of a cone-type of electronic dual-channel MFP in accordance with some embodiments of the present invention.

Referring for the moment FIG. 2C yet another type of electronic MFP is shown. Electronic MFP 200 is a cone-type of electronic MFP. For example, MFP 200 can be similar to cone-type MFPs disclosed in U.S. Pat. Nos. 6,012,331 and 6,076,963, but will include dual-channel circuitry as described below. Cone 202 protrudes into the air stream that moves past the skin 205 of the aircraft, while an instrument housing 204 is positionable inside the skin of the aircraft. In accordance with embodiments of the invention, electronic MFP 200 includes first and second electronics channels (channel A 206-1 and channel B 206-2 illustrated in FIG. 2C) positioned in instrument housing 204. Although barrel, vane and cone types of electronic MFPs are shown in the figures, the present invention extends to other types of dual-channel electronic MFP.

Sometimes, the barrel, vane or cone, sensing ports and other related portions of the probe (besides the electronics) are referred to as the MFP. As used herein, the probe (or MFP) and electronics combination is referred to as an electronic MFP. More specifically, as is described below in greater detail, the present invention includes dual-channel electronic MFPs and multi-probe systems using the same to provide independent and dissimilar air data systems. It must be noted that the particular probe or MFP configuration shown (i.e., barrel and port configurations, vane and port configurations or cone and port configurations) is provided as an example, but does not limit the invention to this particular design. The present invention applies more generally to dual-channel electronic MFPs, regardless of the particular probe or MFP design.

Each housing includes Channel A circuitry (14-1, 16-1, 18-1, 20-1) and Channel B circuitry (14-2, 16-2, 18-2 and 20-2), with the Channel A circuitry of each probe being dissimilar to the channel B circuitry of the probe. The term "dissimilar" used in the context of the present invention can mean any of several related things. From the perspective of a single electronic MFP, its respective channels can be dissimilar by utilizing different chip sets (e.g. different microprocessors from different manufacturers) and other components, different software or firmware (for example developed by different software or firmware development teams), as well as implementation of different functions within each of the two channels. However, from a two-probe system perspective, the system provided by combining a channel from a first electronic MFP with a channel from a second electronic MFP is preferably also dissimilar from a second system configured from the second channels of each of these two MFPs. Dissimilarity in the context of the present invention will be described later in greater detail. While electronic MFPs 14, 16, 18 and 20 are shown in FIGS. 1 and 2, the present invention can, in some embodiments, only include two dual-channel electronic MFPs such as probes 14 and 16 or other combinations such as probes 16 and 18.

As shown in FIG. 2A, in one embodiment the channel A circuitry 14-1 of electronic MFP 14 is electrically connected to the channel A circuitry 16-1 of electronic MFP 16 to form a first two-probe system designated generally at 24. Similarly, the channel B circuitry 14-2 of electronic MFP 14 is electrically coupled to the channel B circuitry 16-2 of electronic MFP 16 to form a second two-probe system designated at 26. Likewise, the channel A circuitry 18-1 and the channel B circuitry 18-2 of electronic MFP 18 are electrically coupled, respectively, to channel A circuitry 20-1 and channel B circuitry 20-2 of electronic MFP 20 to form two-probe systems 28 and 30. Each of these two-probe systems can be electrically connected to flight control systems and/or display systems (designated generally at 38) by data bus 32 or other electrical connections.

Figure 3:
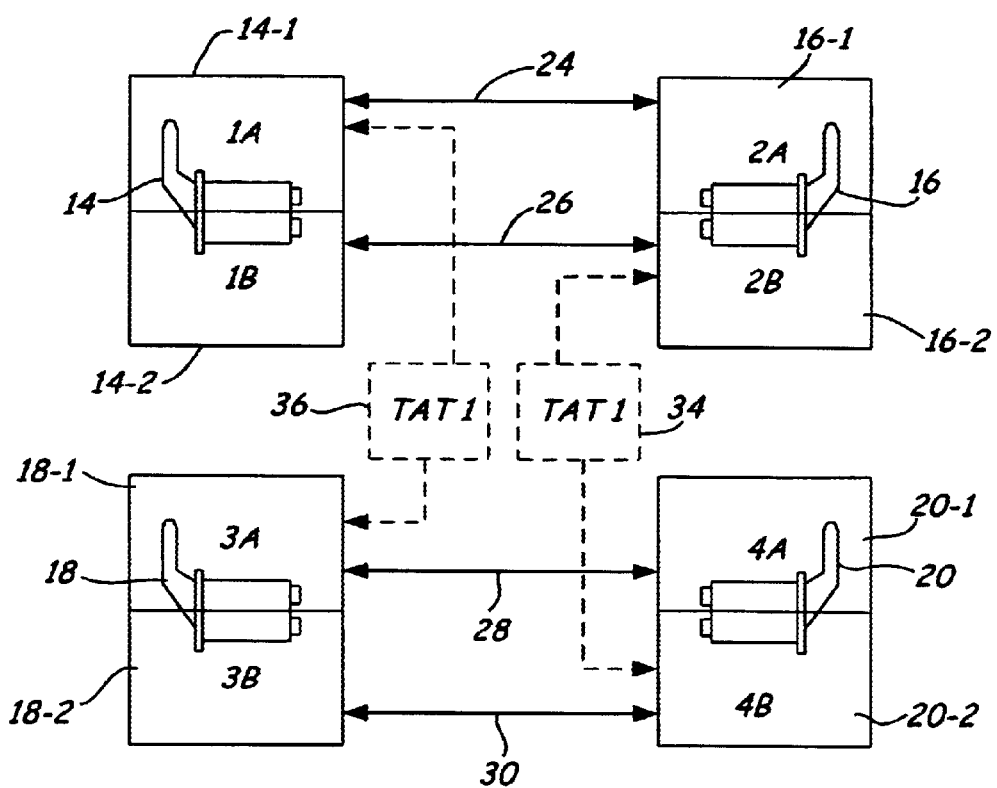
FIG. 3 is a diagrammatic representation of four independent air data systems, including two sets of two dissimilar air data systems, formed using four electronic MFPs in accordance with one embodiment of the invention.

FIG. 3 is a block diagram which diagrammatically illustrates the four two-probe systems 24, 26, 28 and 30 shown in FIG. 2, further including first and second total air temperature probes 34 and 36. In this particular embodiment, total air temperature (TAT) probe 36 provides a TAT measurement to each of channel A circuitry 14-1 in probe 14 and channel A circuitry 18-1 in probe 18. A second TAT probe 34 provides a TAT measurement to each of channel B circuitry 16-2 of electronic MFP 16 and channel B circuitry 20-2 of electronic MFP 20. Thus, if desired, each of the four systems 24, 26, 28 and 30 has access to, and can utilize, a TAT measurement.

Figure 4:
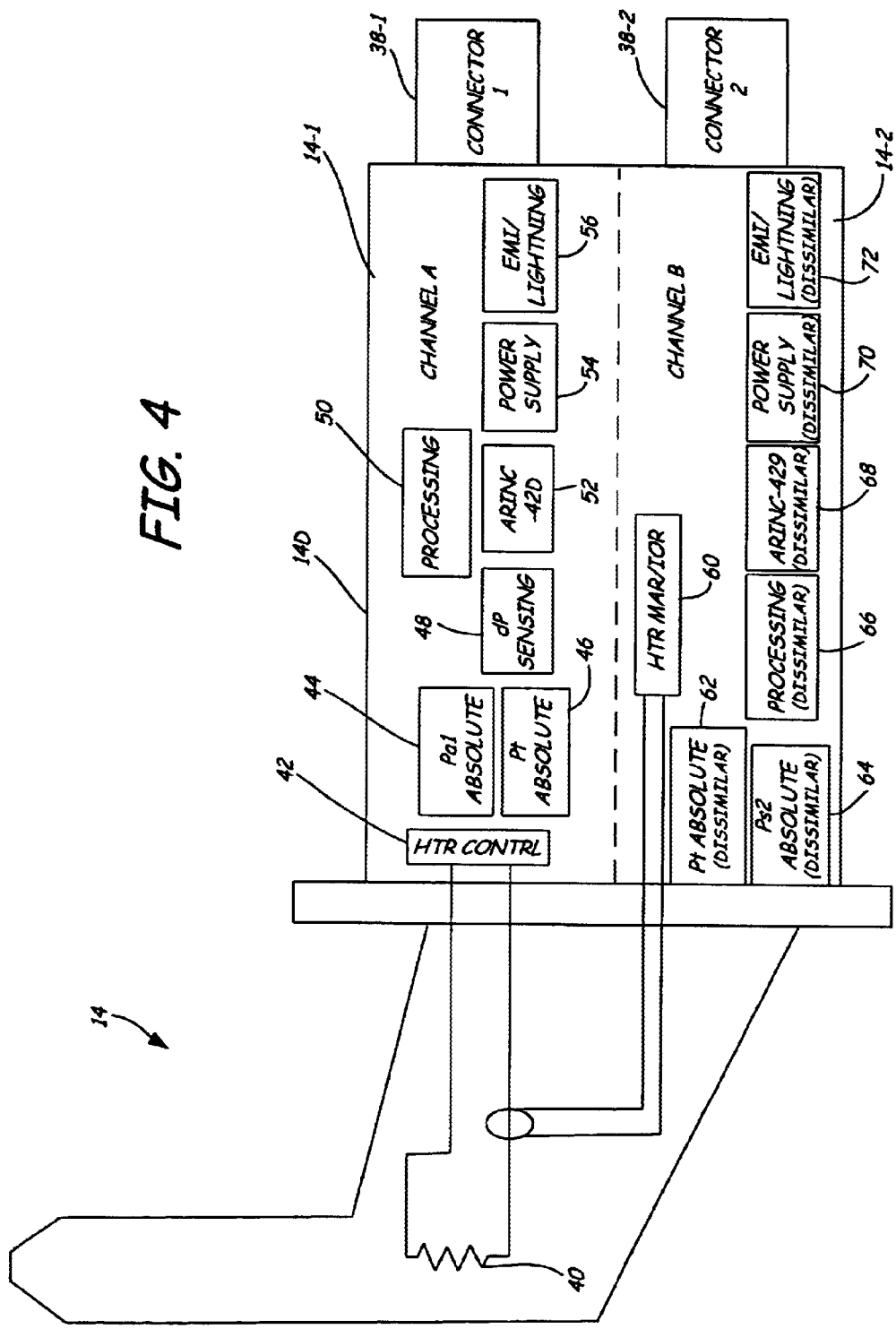
FIG. 4 is a block diagram illustrating circuitry of one or more of the dual-channel electronic MFPs, in one example embodiment of the invention.

FIG. 4 is a diagrammatic illustration of a dual-channel electronic MFP 14 in accordance with one example embodiment of the present invention. In one embodiment, electronic MFP 14 is a left hand side electronic MFP. As shown in FIG. 4, channel A circuitry 14-1 and channel B circuitry 14-2, each contained within housing 14D, have respective connectors 38-1 and 38-2 for connecting these portions of electronic MFP 14 to corresponding portions of a second electronic MFP and/or to the flight control systems and display systems 38.

In this example embodiment, electronic MFP 14 includes a heater element 40 used for de-icing the probe. Channel A circuitry 14-1 includes a heater control circuit 42, while channel B circuitry 14-2 includes a heater monitor circuit 60. Relating to the measurement of the various pressures described above, in this embodiment channel A circuitry 14-1 includes an absolute pressure sensor 44 which measures the first angle of attack pressure $P\alpha_1$. A second absolute pressure sensor 46 measures the total pressure, while a differential pressure sensor 48 provides the main AOA measurement which is compensated using the other pressures using computation methods of the type which are known in the art. Processing circuitry 50 can include one or more microprocessors which manipulate the data provided by pressure sensors 44, 46 and 48, as well as possibly others, in order to calculate local and aircraft parameters such as AOA, AOS and static pressure. Communication circuitry 52 is provided for facilitating communications between processing circuitry 50 and other electronic MFPs or systems via connector 38-1. In some embodiments, communication circuitry 52 is ARINC-429 circuitry. Power supply circuitry 54 provides power to the various components in channel A 14-1, while protection circuitry 56 provides electromagnetic interference (EMI) and lightening protection for the circuitry.

In this example embodiment, channel B circuitry 14-2 includes first and second absolute pressure sensors 62 and 64 for measuring other pressures of the type described above with reference to the electronic MFP ports. Processing circuitry 66, communication circuitry 68, power supply circuitry 70 and protection circuitry 72 all provide similar functions to those described above with reference to channel A circuitry 14-1, but instead provide these functions for channel B circuitry 14-2.

FIG. 4 illustrates one configuration for electronic MFPs used on a first side of the aircraft. For example, while FIG. 4 illustrates electronic MFP 14, these configuration can be used for each of electronic MFPs 14 and 18 allowing a single left side electronic MFP configuration and part number to be employed for an aircraft, thereby preventing the need for manufacturing, stocking, servicing, etc. of too many different electronic MFP configurations for a particular aircraft. On the opposite side of the aircraft, the channel A circuitry and the channel B circuitry may be switched in regard to which functions are performed by these channels, so that, a combination of channel A circuitry from a left side electronic MFP with channel A circuitry from a right side electronic MFP will provide all of the pressure measurement necessary for that two-probe system to calculate the local and/or aircraft parameters required. A more detailed discussion of several example embodiments of this type are provided below with reference to FIGS. 5 and 6.

Still referring to FIG. 4, in addition to a separation of various pressure measurements between channel A and channel B, in order to aid in achieving dissimilarity between systems, the two channels provide their respective independent measurements of pressure and subsequent calculation of air data parameters while incorporating independent and dissimilar complex hardware and software. For example, in one embodiment the absolute pressure sensors used in one of channel A and channel B are resistive technology pressure sensors, while the absolute pressure sensors used in the other of channel A and channel B are capacitive technology pressure sensors. Likewise, the processing circuitry 50 and 66 used in the two separate channels can include different microprocessors or microcontrollers provided by different chip manufacturers. For example, in one embodiment, processing circuitry 50 can include a Motorola HC16 microcontroller, while processing circuitry 66 used in channel B can include a Texas Instruments TMS320C33 DSP. As a further example, in one embodiment the ARINC-429 transceiver used in communication circuitry 52 of channel A 14-1 is an ILC Data Device Corporation transceiver DDC 00429, while the ARINC-429 transceiver used in communication circuitry 68 of channel B 14-2 is a Holt 8582 device.

Generally, in making channel A dissimilar from channel B, it can be preferable to include as much dissimilarity as possible between the pressure sensor technologies used, the types and/or manufacturers of the central processing units used, the software/firmware used (including development of the software/firmware by separate development teams if desired), the communication devices used (i.e., the ARINC interfaces), the types of field programmable gate arrays, (FPGA's), the types of power supplies, the types of EMI and lightening protection, and the probe heater monitoring and supply. The greater the degree of dissimilarity between the two channels, the more remote the possibility of a common mode error occurring.

Figure 5:
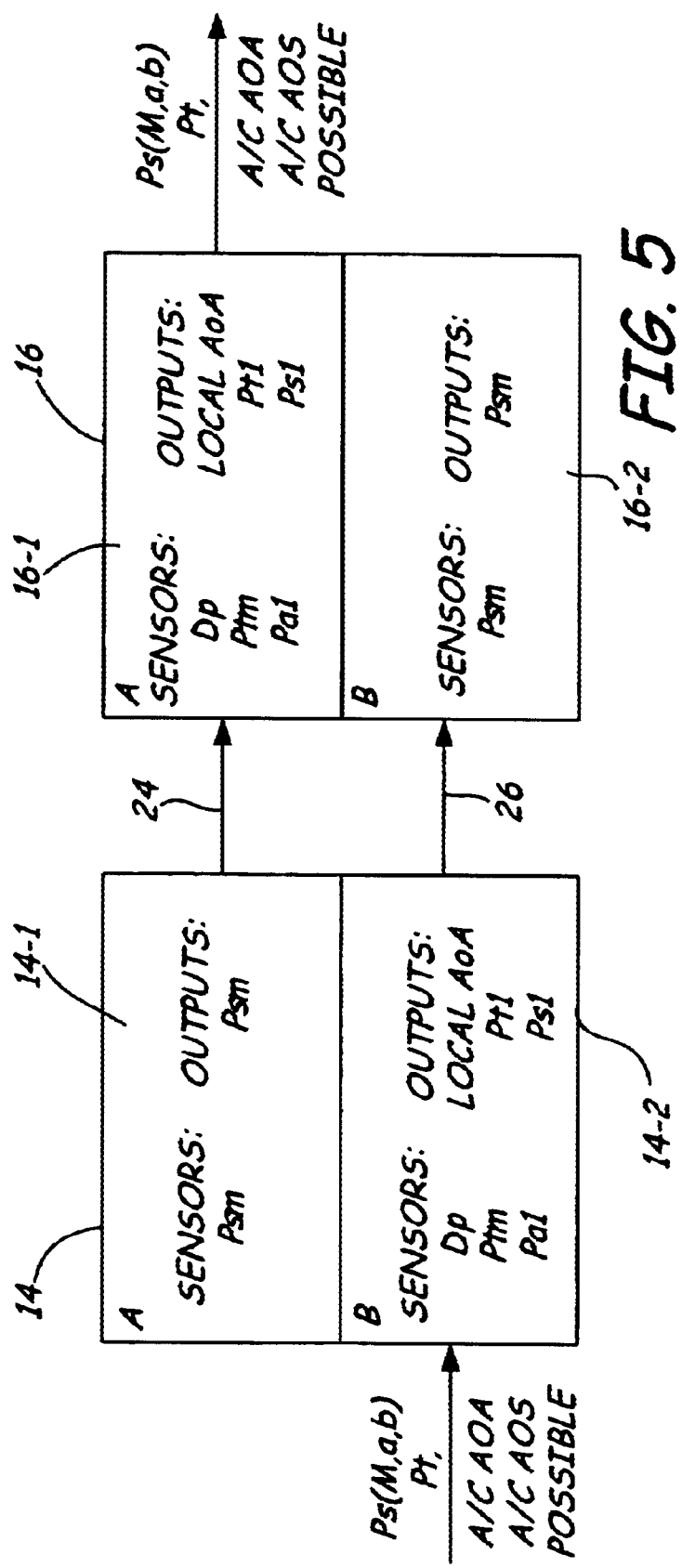
FIGS. 5 and 6 illustrate various example embodiments having different circuitry configurations for left side and right side dual-channel electronic MFPS.
Figure 6:
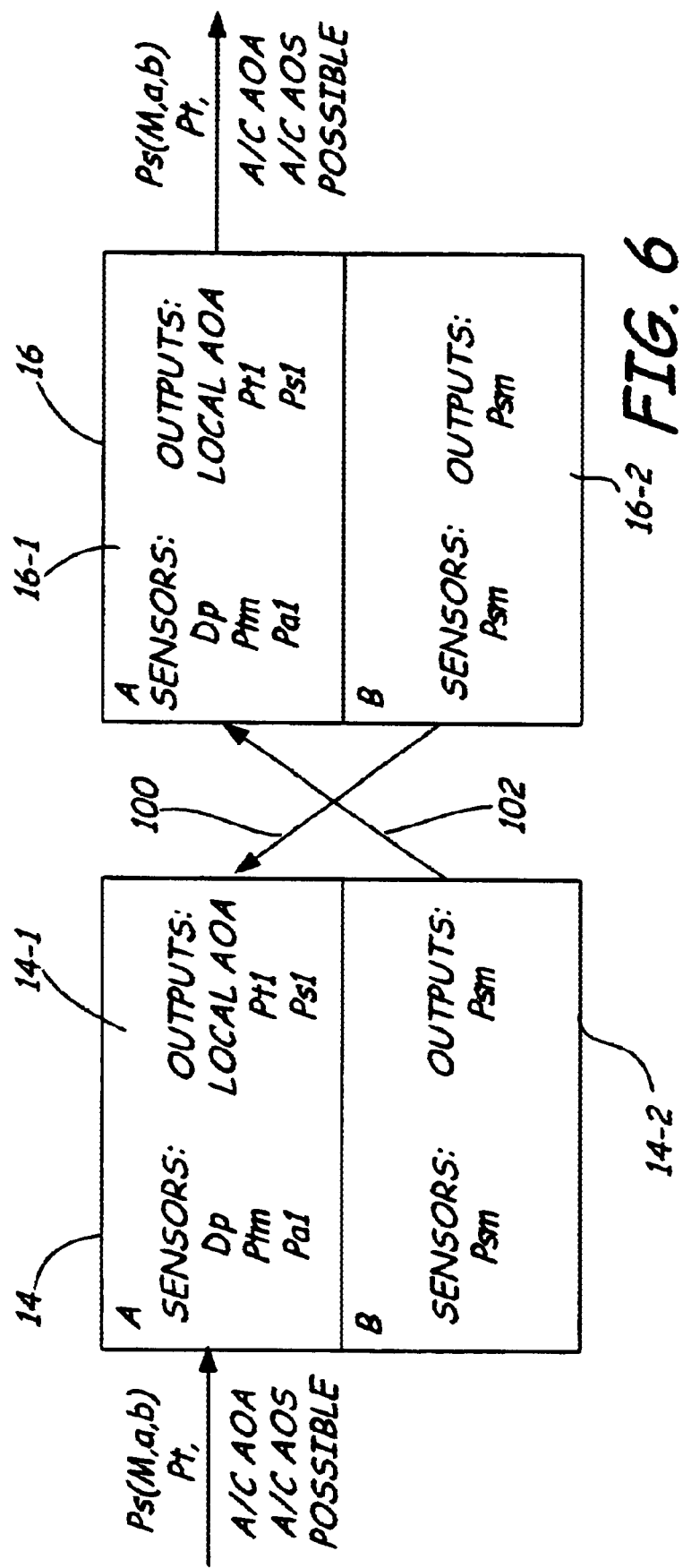

Referring now to FIG. 5, a first embodiment illustrating the division of functionality between the channel A circuitry and the channel B circuitry of a left hand side electronic MFP such as electronic MFP 14, as well as the division of functionality between the channel A circuitry and the channel B circuitry of a right hand side electronic MFP such as electronic MFP 16, is illustrated. In this particular embodiment, which is provided by way of example only, channel A circuitry 14-1 of electronic MFP 14 includes a pressure sensor for measuring the static pressure $P_{sm}$, and outputs static pressure measurements. Channel A circuitry 16-1 of electronic MFP 16, which combines with channel A circuitry 14-1 of electronic MFP 14 to form system 24, includes an absolute pressure sensor to measure the total pressure $P_{tm}$, an absolute pressure sensor to measure half of the AOA pressure $P_{a1}$ (or $P_{\alpha1}$), and a differential pressure sensor to measure the differential pressure between the two AOA pressure sensing parts ($P_{a1}-P_{a2}$ or $P_{\alpha1}-P_{\alpha2}$). As is known in the art, the differential pressure sensor measurement and the angle of attack pressure measurement can be combined to determine the local AOA. Thus, channel A 16-1 of electronic MFP 16 can provide a local AOA, a local total pressure $P_{tl}$ and a local static pressure $P_{sl}$ using the processing devices in channel A circuitry 14-1 or channel A circuitry 16-1 of either of the electronic MFPs. Known methodology can then be used to generate aircraft parameters such as aircraft AOA or aircraft AOS.

The functionality of channel B circuitry 14-2 of electronic MFP 14 and channel B circuitry 16-2 of electronic MFP 16 is reversed. In other words, channel B circuitry 14-2 performs the same functions as channel A circuitry 16-1, while channel B circuitry 16-2 performs the same functions as channel A circuitry 14-1. This provides a second set of aircraft parameters using independent system 26. Since dissimilar components, software and/or firmware are used between channels A and B, independent systems 24 and 26 are also dissimilar systems.

While a system such as the one shown in FIG. 5 uses two electronic MFPs to achieve two independent and dissimilar air data systems, it does require two different circuitry configurations, one for left hand side electronic MFPs and one for right hand side electronic MFPS. In these embodiments, this is necessary to achieve a separation of functionality for a particular channel (A or B) between the two probes. However, in other embodiments, this can be avoided to some extent if desired. For example, in FIG. 6, the circuit functionality of channel A circuitry 14-1 of electronic MFP 14 is substantially the same as the circuit functionality of channel A circuitry 16-1 of electronic MFP 16. The same is true between the functionality of the channel B circuitry 14-2 and 16-2. However, in this embodiment, instead of coupling the channel A circuitry of electronic MFP 14 to the channel A circuitry electronic MFP 16, and so on, channel A circuitry 14-1 is coupled with channel B circuitry 16-2, while channel A circuitry 16-1 is coupled with channel B circuitry 14-2 to form systems 100 and 102. However, in order to maintain the dissimilarity between these two independent systems 100 and 102, channel A circuitry 14-1 on left hand side electronic MFP 14 would preferably be dissimilar from channel A circuitry 16-1 one right hand side electronic MFP 16. Likewise, dissimilarity between channel B circuitry 14-2 and 16-2 would also preferably exist. Thus, while the channel A circuitry of each type of electronic MFP could maintain the same or similar functionality as channel A circuitry of other electronic MFPs, and likewise with the channel B circuitry of the electronic MFPs, different left and right hand side electronic MFP configurations and part numbers would still be required to some extent in order to achieve dissimilarity between systems 100 and 102.

Figure 7:
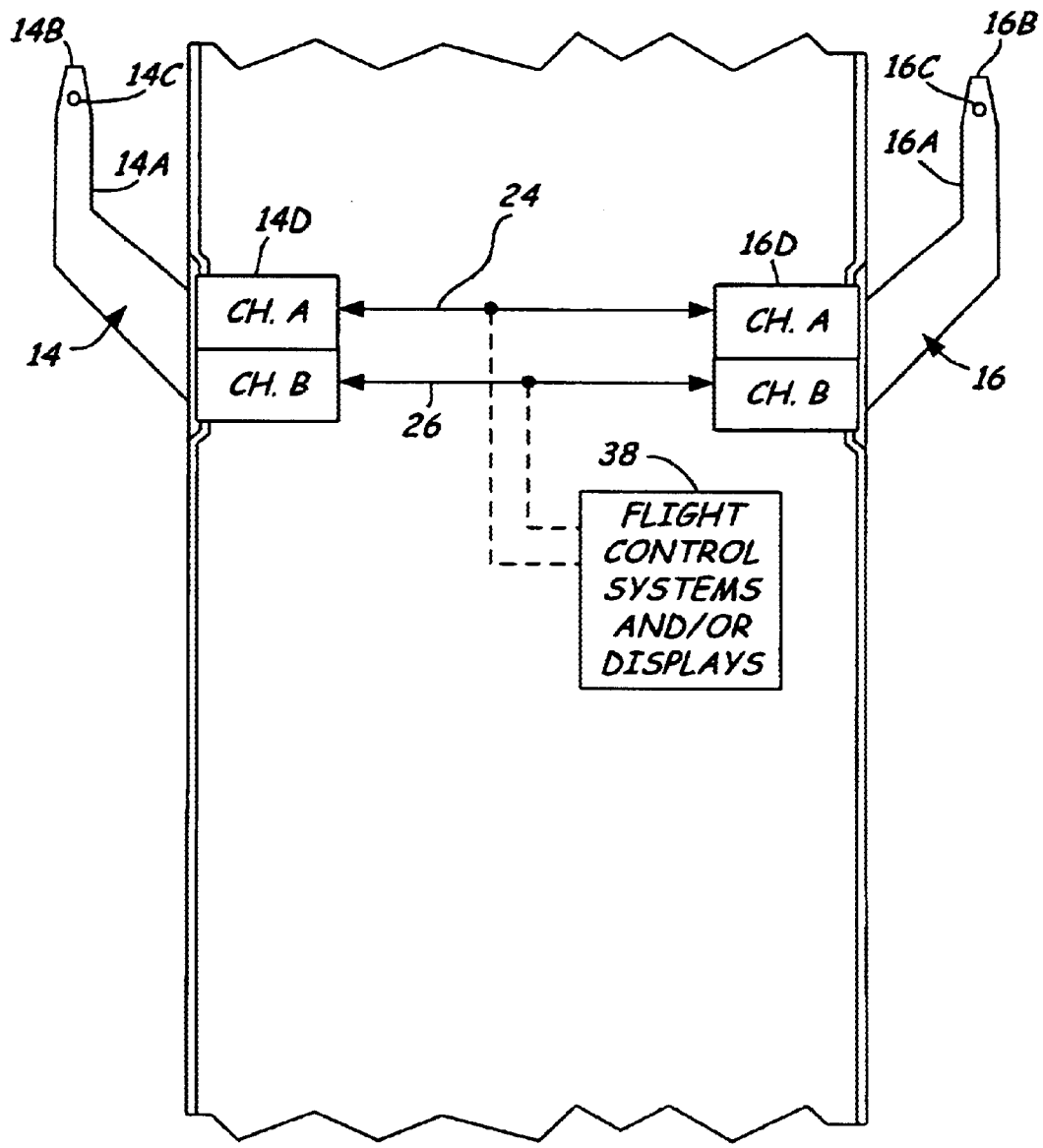
FIG. 7 is a schematic representation of a cross section of a nose portion of an aircraft showing placement of two dual-channel electronic MFPs on opposite sides of the aircraft to provide two independent and dissimilar air data systems in accordance with one alternate embodiment of the present invention.

While the present invention has thus far been described with reference to four dual-channel electronic MFPs combined in a manner which will provide four independent air data systems (two sets of two dissimilar systems), the present invention is not limited to four-probe configurations. For example, FIG. 7 is an illustration of a system having only two electronic MFPs 14 and 16. electronic MFPs 14 and 16 can be connected, as described above, with each of the channels of electronic MFP 14 coupled to a corresponding one of the channels of electronic MFP 16 to form independent and dissimilar systems 24 and 26. While FIG. 7 illustrates channels A and B of electronic MFP 14 being coupled respectively to channels A and B of electronic MFP 16, this embodiment is not so limited. In other words, channel A of electronic MFP 14 can be coupled to channel B of electronic MFP 16, and vice versa, in other embodiments as described above.

Figure 8:
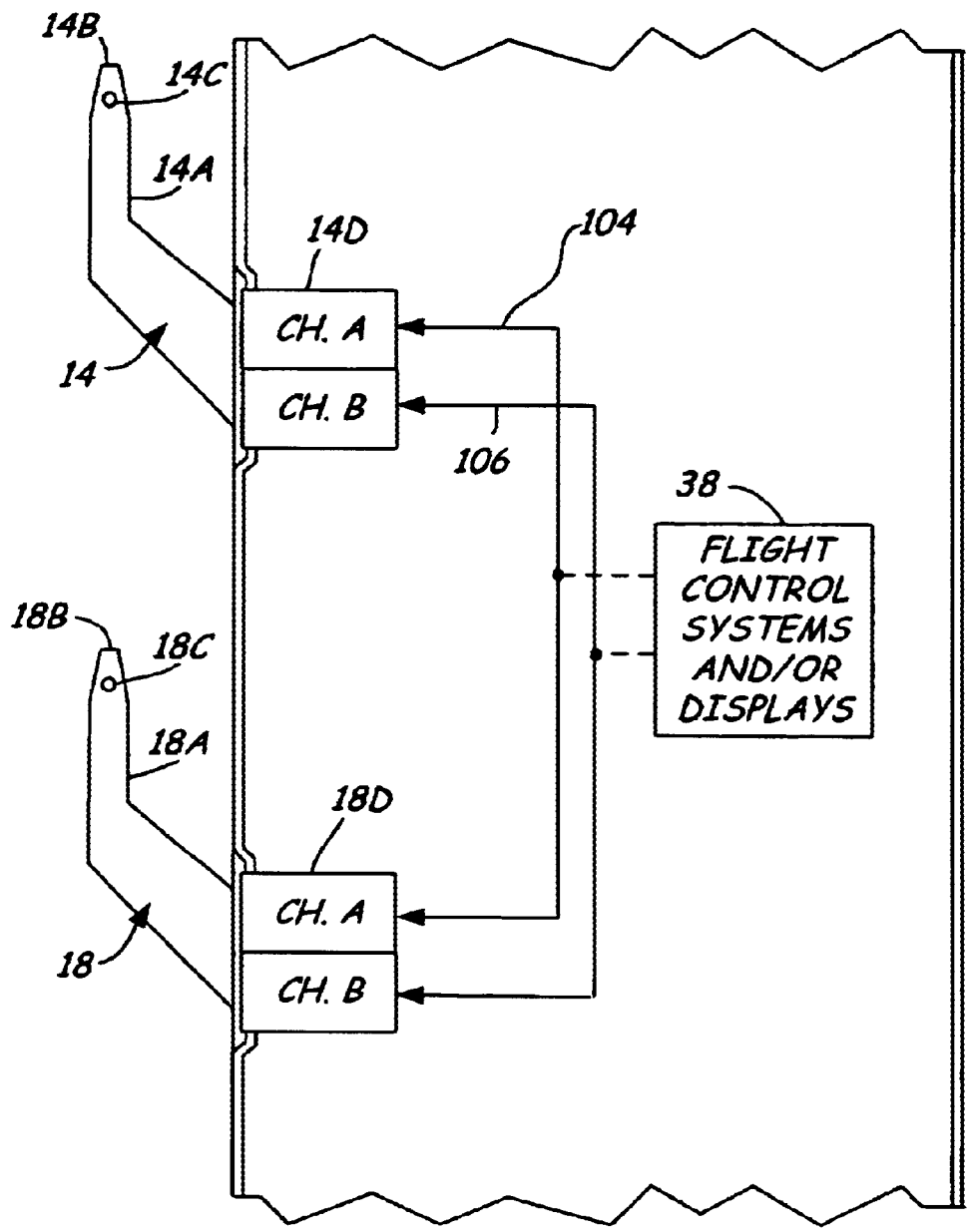
FIG. 8 is a schematic representation of a cross section of a nose portion of an aircraft showing placement of two dual-channel electronic MFPs on the same side of the aircraft to provide two independent and dissimilar air data systems in accordance with one alternate embodiment of the present invention.

FIG. 8 is an illustration of another two-probe configuration. In this embodiment, each of channels A and B of left hand side electronic MFP 14 are coupled to a corresponding one of channels A and B of another left hand side electronic MFP 18. In this case, electronic MFP 14 and electronic MFP 18 could not be of identical configurations (and thus part numbers) and still achieve independence and dissimilarity between the resulting systems 104 and 106. In general, the present invention is not limited to any particular configuration between dual-channel electronic MFPs. Instead, the present invention is directed more generally to configurations in which the channels of a first dual-channel electronic MFP are coupled to the channels of a second dual-channel electronic MFP in a manner which will achieve two independent and dissimilar systems between the two electronic MFPs.

To this end, when a system for providing independent and dissimilar aircraft air data parameter estimations, as described and claimed herein, includes at least first and second dual-channel electronic MFPs positionable adjacent an aircraft skin. Each dual-channel electronic MFP includes a plurality of pressure sensing ports (for example positioned on a barrel, vane or cone and an electronics housing. Within the electronics housing of each of the first and second dual-channel electronic MFP are first and second electronics channels. The first electronics channel of the first dual-channel electronic MFP is electrically coupled with the first electronics channel of the second dual-channel electronic MFP to provide a first air data system providing aircraft air data parameter estimations. The second electronics channel of the first dual-channel electronic MFP is electrically coupled with the second electronics channel of the second dual-channel electronic MFP to provide a second air data system providing aircraft air data parameter estimations. The first and second air data systems are independent and dissimilar from one another.

It is to be understood that the first electronics channel of the first dual-channel electronic MFP being electrically coupled to the first electronics channel of the second dual-channel electronic MFP to provide a first air data system includes Channel A of the first dual-channel electronic MFP being electrically coupled to either of Channels A (see FIG. 5 for example) or B (see FIG. 6 for example) of the second dual-channel electronic MFP. The same is true for the second electronics channels being coupled. In other words, the first electronics channel of a dual-channel electronic MFP is definable as corresponding to either of Channels A or B of that dual-channel electronic MFP. The same definition can be applied to the second dual-channel electronic MFP, or the definitions can be reversed. Thus, this language used to describe and claim the present invention covers embodiments such as those shown in FIGS. 5 and 6, as well as other embodiments.

Although the present invention has been described with reference to preferred embodiments, workers skilled in the art will recognize that changes may be made in form and detail without departing from the spirit and scope of the invention.

What is claimed is:

1. A system for providing independent and dissimilar aircraft air data parameter estimations, the system comprising:

a first dual-channel electronic multi-function probe (MFP) positionable adjacent an aircraft skin and having a plurality of pressure sensing ports and an electronics housing, the first dual-channel electronic MFP further including first and second electronics channels positioned within the electronics housing;

a second dual-channel electronic MFP positionable adjacent the aircraft skin and having a plurality of pressure sensing ports and an electronics housing, the second dual-channel electronic MFP further including first and second electronics channels positioned within the electronics housing;

wherein the first electronics channel of the first dual-channel electronic MFP is electrically coupled with the first electronics channel of the second dual-channel electronic MFP to provide a first air data system providing aircraft air data parameter estimations, wherein the second electronics channel of the first dual-channel electronic MFP is electrically coupled with the second electronics channel of the second dual-channel electronic MFP to provide a second air data system providing aircraft air data parameter estimations, and wherein the first and second air data systems are independent and dissimilar from one another.

2. The system of claim 1, wherein for each of the first and second electronic MFPs the corresponding plurality of pressure sensing ports are located on a barrel of the particular electronic MFP and the electronics housing is positionable inside the skin of the aircraft while the barrel protrudes into an airstream that moves past the skin of the aircraft.

3. The system of claim 1, wherein for each of the first and second electronic MFPs the corresponding plurality of pressure sensing ports are located on a vane of the particular electronic MFP and the electronics housing is positionable inside the skin of the aircraft while the vane protrudes into an airstream that moves past the skin of the aircraft.

4. The system of claim 1, wherein for each of the first and second electronic MFPs the corresponding plurality of pressure sensing ports are located on a cone of the particular electronic MFP and the electronics housing is positionable inside the skin of the aircraft while the cone protrudes into an airstream that moves past the skin of the aircraft.

5. The system of claim 1, wherein the first electronics channel of the first dual-channel electronic MFP contains circuitry which is dissimilar from circuitry contained in the second electronics channel of the first dual-channel electronic MFP, and wherein the first electronics channel of the second dual-channel electronic MFP contains circuitry which is dissimilar from circuitry contained in the second electronics channel of the second dual-channel electronic MFP.

6. The system of claim 5, wherein the circuitry contained in the first electronics channels of each of the first and second dual-channel electronic MFPs include pressure sensors of a first technology type, while the circuitry contained in the second electronics channels of each of the first and second dual-channel electronic MFPs include pressure sensors of a second technology type different than the first technology type.

7. The system of claim 5, wherein the circuitry contained in the first electronics channel of the first dual-channel electronic MFP includes a first type of microprocessor, while the circuitry contained in the second electronics channel of the first dual-channel electronic MFP includes a second type of microprocessor different than the first type of microprocessor.

8. The system of claim 7, wherein the circuitry contained in the first electronics channel of the first dual-channel electronic MFP includes circuitry programmed with first software, while the circuitry contained in the second electronics channel of the first dual-channel electronic MFP includes circuitry programmed with second software which is dissimilar with the first software.

9. The system of claim 5, wherein the circuitry contained in the first electronics channel of the first dual-channel electronic MFP includes communication circuitry of a first type, while the circuitry contained in the second electronics channel of the first dual-channel electronic MFP includes communication circuitry of a second type different than the first type.

10. The system of claim 5, wherein the circuitry contained in the first electronics channel of the first dual-channel electronic MFP includes power supply circuitry of a first type, while the circuitry contained in the second electronics channel of the first dual-channel electronic MFP includes power supply circuitry of a second type different than the first type.

11. The system of claim 1, wherein the first dual-channel electronic MFP is a left hand side electronic MFP positionable adjacent a left hand side of the aircraft skin, while the second dual-channel electronic MFP is a right hand side electronic MFP positionable adjacent a right hand side of the aircraft skin.

12. The system of claim 1, wherein each of the first and second dual-channel electronic MFPs are configured to be positioned adjacent a same side of the aircraft skin.

13. The system of claim 1, and further comprising:
   a third dual-channel electronic MFP positionable adjacent the aircraft skin and having a plurality of pressure sensing ports and an electronics housing, the third dual-channel electronic MFP further including first and second electronics channels positioned within the electronics housing;
   a fourth dual-channel electronic MFP positionable adjacent the aircraft skin and having a plurality of pressure sensing ports and an electronics housing, the fourth dual-channel electronic MFP further including first and second electronics channels positioned within the electronics housing; and
   wherein the first electronics channel of the third dual-channel electronic MFP is electrically coupled with the first electronics channel of the fourth dual-channel electronic MFP to provide a third air data system providing aircraft air data parameter estimations, wherein the second electronics channel of the third dual-channel electronic MFP is electrically coupled with the second electronics channel of the fourth dual-channel electronic MFP to provide a fourth air data system providing aircraft air data parameter estimations, and wherein the third and fourth air data systems are independent and dissimilar from one another.

14. The system of claim 13, wherein the first, second, third and fourth air data systems are independent from one another, and wherein the first and third air data systems are dissimilar from the second and fourth air data systems.

* * * * *